(12) United States Patent
Greive et al.

(10) Patent No.: US 12,070,018 B2
(45) Date of Patent: Aug. 27, 2024

(54) SEMIRIGID POULTRY AND/OR SWINE ENCLOSURE

(71) Applicant: PERDUE FOODS LLC, Salisbury, MD (US)

(72) Inventors: Raymond Paul Greive, Murrieta, CA (US); Jeffrey Lane McDaniel, Murrieta, CA (US); Daniel J. Coady, Warmer Springs, CA (US)

(73) Assignee: PERDUE FOODS LLC, Salisbury, MD (US)

( * ) Notice: Subject to any disclaimer, the term of this patent is extended or adjusted under 35 U.S.C. 154(b) by 0 days.

(21) Appl. No.: 18/123,873

(22) Filed: Mar. 20, 2023

(65) Prior Publication Data
US 2023/0225296 A1 Jul. 20, 2023

Related U.S. Application Data

(63) Continuation of application No. 17/379,802, filed on Jul. 19, 2021, now Pat. No. 11,606,934, which is a
(Continued)

(51) Int. Cl.
*A01K 31/18* (2006.01)
*A01K 1/00* (2006.01)
*G01C 21/20* (2006.01)

(52) U.S. Cl.
CPC ............ *A01K 31/18* (2013.01); *A01K 1/0035* (2013.01); *G01C 21/20* (2013.01)

(58) Field of Classification Search
CPC .... A01K 31/007; A01K 31/18; A01K 1/0035; A01K 1/015; A01K 1/0236; A01K 2227/108; A01K 2227/30; G01C 21/20
See application file for complete search history.

(56) References Cited

U.S. PATENT DOCUMENTS 33,605 A * 10/1861 Robinson ............. A01K 1/0035
119/410
3,469,822 A 9/1969 O'Brien
(Continued)

FOREIGN PATENT DOCUMENTS

CN 111820139 A * 10/2020
CN 111820139 A 10/2020
(Continued)

OTHER PUBLICATIONS

International Search Report and Written Opinion for Application No. PCT/US2020/050265, mailed on Feb. 12, 2021.
(Continued)

*Primary Examiner* — Monica L Perry
*Assistant Examiner* — Aaron M Rodziwicz

(57) ABSTRACT

An at least partially floorless semirigid poultry enclosure configured to flex and/or adjust to accommodate undulating terrain during movement across a field. The semirigid poultry enclosure may comprise a semirigid foundation. The semirigid foundation may include one or more flexible portions disposed between two or more rigid structural elements. The semirigid poultry enclosure may include an automated movement system configured to facilitate movement of the semirigid poultry enclosure on a field. The automated movement system may be configured to move a semirigid poultry enclosure that is at least 90 feet in length via multiple drive units coupled to a semirigid foundation.

16 Claims, 7 Drawing Sheets

Related U.S. Application Data continuation-in-part of application No. 17/017,609, filed on Sep. 10, 2020, now Pat. No. 11,503,811.

(60) Provisional application No. 62/898,512, filed on Sep. 10, 2019.

(56) References Cited

U.S. PATENT DOCUMENTS

| | | | |
|---|---|---|---|
| 4,048,959 | A | 9/1977 | Steele et al. |
| 4,924,813 | A | 5/1990 | Bixler et al. |
| 10,189,319 | B2 | 1/2019 | Fu |
| 2019/0110430 | A1 | 4/2019 | Badiou |
| 2020/0047757 | A1* | 2/2020 | Karlsson ............ B60W 30/165 |
| 2020/0137986 | A1* | 5/2020 | Padour, II ............ A01K 1/0035 |
| 2020/0187449 | A1* | 6/2020 | Hallstrom ............ E05D 11/1007 |
| 2020/0260695 | A1* | 8/2020 | Rosales ................ A01K 31/16 |
| 2020/0267943 | A1* | 8/2020 | Padour, II ............ A01K 31/18 |
| 2020/0305386 | A1* | 10/2020 | Niemela ............ A01K 1/0035 |
| 2021/0212293 | A1* | 7/2021 | Lhamon ............ A01K 1/0035 |

FOREIGN PATENT DOCUMENTS

| | | | | |
|---|---|---|---|---|
| CN | 112219729 | A * | 1/2021 | ........... A01K 1/0035 |
| CN | 112219729 | A | 1/2021 | |
| DE | 202019103934 | U1 | 8/2019 | |
| DE | 202019103934 | U1 * | 9/2019 | |
| WO | 2000/059296 | A1 | 10/2000 | |
| WO | 2008/088379 | A2 | 7/2008 | |
| WO | WO-2008088379 | A2 * | 7/2008 | ............. B08B 15/02 |
| WO | 2020/069517 | A2 | 4/2020 | |

OTHER PUBLICATIONS

International Preliminary Report on Patentability for Application No. PCT/US2020/050265, mailed on Mar. 15, 2022.
International Search Report and Written Opinion for Application No. PCT/US2022/037613, mailed on Oct. 27, 2022, 12 pages.
International Preliminary Report on Patentability for Application No. PCT/US2022/037613, mailed on Feb. 1, 2024, 11 pages.

* cited by examiner

SEMIRIGID POULTRY AND/OR SWINE ENCLOSURE

CROSS-REFERENCE TO RELATED APPLICATIONS

The present application is a continuation of U.S. application Ser. No. 17/379,802, filed on Jul. 19, 2021, which is a continuation-in-part of U.S. patent application Ser. No. 17/017,609, filed on Sep. 10, 2020, which claims the benefit of priority to U.S. Provisional Patent Application No. 62/898,512, filed Sep. 10, 2019, the contents of which are incorporated herein by reference.

FIELD

The disclosure relates to a semirigid poultry and/or swine enclosure.

BACKGROUND

Conventional poultry and/or swine production uses stationary facilities. Due to their stationary nature, poultry and/or swine in conventional systems often live in dirty litter and/or fecal matter. As such, conventional poultry require vaccines, antibiotics and/or other drugs, and/or increased management practices to keep animals healthy. Stationary systems also require litter, bedding, and/or waste disposal/removal which leads to high materials costs, elevated labor costs, and environmental concerns. Furthermore, poultry and/or swine that are treated with vaccines, drugs, and antibiotics, and may subsequently lead to negative health effects on humans that consume their meat and eggs.

Existing methods of pasture raising poultry and/or swine are expensive for both farmers and consumers and thus are typically limited to small scale production. The amount of land and labor required to manage a large quantity of grazing poultry and/or swine has typically prevented pasture raised poultry and/or swine from being scalable for commercial poultry and/or swine farmers.

SUMMARY

One aspect of the disclosure relates to a semirigid poultry and/or swine enclosure. The semirigid poultry and/or swine enclosure may be moved and/or may move across a field to provide access to fresh pasture and bedding daily, eliminating the need for litter disposal, bedding, and vaccines, drugs, or antibiotics and allowing them to graze on pasture, grass, insects, worms, seeds, weeds, and flowers. As the semirigid poultry and/or swine enclosure moves across a field with an undulating landscape, it may flex and/or adjust to accommodate the terrain and prevent the escape of the poultry and/or swine.

One aspect of the semirigid poultry and/or swine enclosure may include a semirigid foundation. The semirigid foundation may comprise one or more flexible joints between rigid structural elements. The flexible joints may allow movement between the rigid structural elements. As such, the foundation may be semirigid and semiflexible. As the poultry and/or swine enclosure moves over uneven terrain, the flexible joints may enable portions of the semirigid foundation to flex while the rigid structural elements provide a solid foundation for a poultry and/or swine enclosure. The flexible joints may be links and/or linkages that enable flexion between the one or more rigid structural elements.

One aspect of the semirigid poultry and/or swine enclosure may include a semirigid frame. The semirigid frame may comprise one or more flexible joints between rigid structural elements. The flexible joints may allow movement between the rigid structural elements. As such, the frame of the poultry and/or swine enclosure may be semirigid and semiflexible. As the poultry and/or swine enclosure moves over uneven terrain, the flexible joints enable portions of the semirigid frame to flex while the rigid structural elements provide a solid frame for a poultry and/or swine enclosure.

The rigid structural elements of the semirigid foundation and/or semirigid frame may comprise piping (e.g., steel piping), framing (e.g., metal framing components), beams, wood beams, rubber, fiberglass, plastic, steel, aluminum, epoxy, composite materials, and/or other materials. A semirigid frame and/or foundation may be made of multiple rigid structural elements. Some or all of the rigid structural elements may be coupled together via flexible joints.

The flexible joints may include one or more of a pivot point joint, a universal joint ("U-joint"), a hinge joint, a prismatic joint, a ball joint, a revolute joint, a hooke joint, and/or any other joint that would facilitate movement between the rigid structural elements. The flexible joints may facilitate horizontal, vertical, lateral, and/or any other directional movement. In some implementations, the flexible joints may comprise a flexible material such that the rigid structural elements are coupled together via a flexible material.

In some implementations, the semirigid foundation may include a chassis such that the poultry and/or swine enclosure is mobile. The chassis may include rigid structural elements and/or flexible joints. The rigid structural element(s) of the chassis may include a drive shaft. The drive shaft may have one or more flexible joints.

In some implementations, the poultry and/or swine enclosure may comprise multiple wall barriers. The wall barriers may at least partially form the enclosure and/or contain the poultry and/or swine within the enclosure. The wall barriers may be coupled to the semirigid foundation and/or frame. In some implementations, the wall barriers may be resiliently flexible. By way of non-limiting example, the wall barriers may be made of one or more of and/or a combination of fences, walls, netting, wood, paneling, mesh, wire, cloth, metal sheeting, shingles, tarpaper, windows, canvas, plastic, tarp, rubber, and/or other materials. In some implementations, one or more wall barriers (e.g., outer walls) may consist of chicken wire or a comparable predator-deterring barrier that doesn't prevent fresh air and sunlight from entering. In some implementations, for example, one or more portions of the wall barriers may include canvas, plastic, panels, windows, louvers, and/or another material that rolls up/down for temperature regulation (the deployment of which may automated, including thermostatic regulation). In some implementations, one or more wall barriers may have multiple layers with one or more (e.g., multiple) slits along its length in order to conform to the contours of the field and/or close any gaps through which the animals could escape.

In some implementations, the wall barriers may be rigid. The rigid wall barriers may be coupled together via flexible wall connectors. The flexible wall connectors may connect the rigid wall barriers and allow some flexibility between barriers. By way of non-limiting example, the flexible wall connectors may comprise a flexible material disposed between two or more rigid wall barriers, a sliding channel or groove that enables the rigid wall barriers to slide such that one wall barrier may slide up/down to accommodate a dip in the field while the other wall barrier remains at the same height or slides up/down to a different level), one or more hinges disposed between two or more rigid wall barriers, suspension systems such as a leaf spring, strut and piston, hydraulic systems, and/or other flexible wall connectors.

In some implementations, the walls may move naturally as the poultry coop moves over the field. In some implementations, the walls may be automated and/or manual (e.g., via electrical, gas powered, solar, air pressure, water pressure and/or other means).

The poultry and/or swine enclosure may be floorless. As such, the poultry and/or swine contained in the enclosure may be able to graze on a portion of the field. In some implementations, the enclosure may include a chassis with wheels, tracks, skids, and/or rail that facilitates movement of the enclosure. By way of example, there may be a clearance between one or more wall barriers and the field such that at least a portion of the enclosure may pass over deceased poultry and/or swine lying in the field. In some implementations, a lower portion of at least one of the wall barriers may be resiliently flexible. In some implementations, one or more sides of the barriers may be resiliently flexible.

In some implementations, a semirigid poultry enclosure may comprise an automated movement system for the semirigid poultry enclosure. The automated movement system may be configured to move and/or initiate movement for a semirigid poultry enclosure that is at least 100 feet in length. The automated movement system may comprise multiple sensors. In some implementations, the sensors may include GPS sensors and/or other sensors, including but not limited to optical distance sensors and/or encoders. Individual ones of the multiple sensors may be coupled to individual ones of the multiple wheels (wherein the wheels are not limited to wheels and may comprise one or more drive units, tracks, and/or other traction enabling devices). The multiple sensors may be configured to generate sensor information characterizing a location and/or a position of the semirigid poultry enclosure. The automated movement system may comprise one or more processors configured by machine readable instructions.

In some implementations, the automated movement system may include one or more of: one or more servers, one or more sensors, one or more client computing platforms, and/or other components. The one or more sensors may provide sensor information to the one or more servers and/or client computing platforms. The one or more servers may be configured to communicate with one or more client computing platforms according to a client/server architecture and/or other architecture. The one or more servers and/or client computing platforms may include one or more physical processors configured to execute one or more computer program components. The computer program components may include one or more of a sensor information component, a location determination component, a movement determination component, a movement initiation component, and/or other components.

The sensor information component may be configured to obtain the sensor information. The sensor information may be obtained from one or more sensors coupled to the semirigid poultry enclosure. In some implementations, the sensor information may characterize a location and/or position of the semirigid poultry enclosure, a condition of the field, and/or other characteristics of the semirigid poultry enclosure, the poultry, and/or the field. In some implementations, the sensor information may include information characterizing a condition of the field on which the semirigid poultry enclosure is moving/will move, one or more aspects of the weather outside the semirigid poultry enclosure, a temperature and/or humidity level inside the semirigid poultry enclosure, poultry activity within the semirigid poultry enclosure, poultry mortality within the semirigid poultry enclosure, an obstacle in the path of and/or near the semirigid poultry enclosure, and/or other information.

The location determination component may be configured to determine the location and/or position of the semirigid poultry enclosure. The location and/or position of the semirigid poultry enclosure may include a specific location and/or position of the semirigid poultry enclosure within the field, GPS coordinates of the semirigid poultry enclosure, a mapping of the position of the semirigid poultry enclosure, and/or other information. The location determination component may be configured to determine the location and/or the position of the semirigid poultry enclosure based on the sensor information.

The field condition determination component may be configured to determine the condition of the field. The condition of the field may include whether the field is wet, muddy, icy, covered in snow, dry, and/or another field condition. The condition of the field may include a manure level and/or amount of manure on the field. In some implementations, the condition of the field may be determined based on the soil. The field condition determination component may determine the condition of the field based on the sensor information.

The movement determination component may be configured to determine an automated movement based on the sensor information. The movement initiation component may be configured to initiate automated movement of the semirigid poultry enclosure based on the sensor information, the location and/or position of the semirigid poultry enclosure, a determination of the automated movement to be made based on the sensor information, and/or other information. In some implementations, determining an automated movement based on the sensor information may include determining movement of one or more of the multiple wheels based on the location and/or position of the semirigid poultry enclosure in addition to one or more of a condition of the field, weather, a temperature of the semirigid poultry enclosure, poultry activity, poultry mortality, an obstacle and/or other sensor information. In some implementations, the movement determination component may be configured to determine an automated movement of one or more wheels of the semirigid poultry enclosure and/or the semirigid poultry enclosure via machine learning.

In some implementations, as previously set forth herein, the joints of the semirigid foundation may include one or more flexible portions disposed between two or more rigid structural elements. In some implementations, the flexible portions of the semirigid poultry enclosure may comprise a material that is more flexible than the rigid structural elements such that the rigid structural elements are connected via the flexible portions that facilitate flexion of the semirigid poultry enclosure during movement over undulating terrain.

In some implementations, the individual ones of the multiple wheels of the semirigid poultry enclosure are independently movable and/or controllable. In some implementations, automated movement of the semirigid poultry enclosure may include initiating movement of one or more of the individual ones of the multiple wheels.

These and other objects, features, and characteristics of the disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise. As used in the specification and in the claims, the distinctions "first", "second", and/or "third" are used for clarity and distinction purposes and do not indicate order unless the context clearly dictates otherwise.

DETAILED DESCRIPTION

Figure 1:
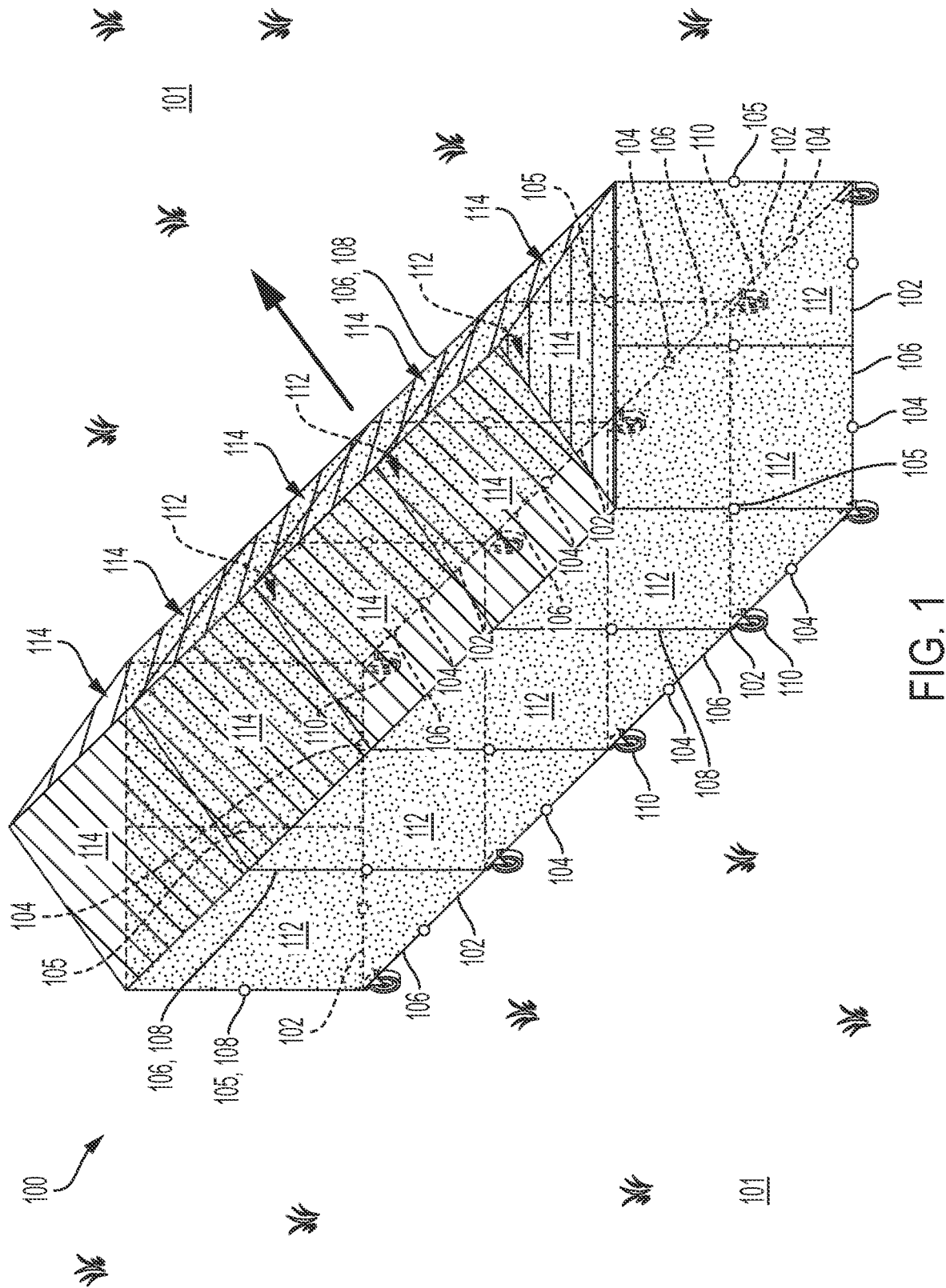
FIG. 1 illustrates a semirigid poultry and/or swine enclosure, in accordance with one or more implementations.

FIG. 1 illustrates a semirigid poultry and/or swine enclosure, in accordance with one or more implementations. Semirigid poultry and/or swine enclosure 100 may be moved and/or may move across a field 101. As semirigid poultry and/or swine enclosure 100 moves across a field with an undulating landscape, it may flex and/or adjust to accommodate the terrain and prevent the escape of the poultry and/or swine.

Semirigid poultry and/or swine enclosure 100 may include a semirigid foundation 102. Semirigid foundation 102 may comprise one or more flexible joints 104 disposed between and/or connecting rigid structural elements 106. Flexible joints 104 may allow movement between rigid structural elements 106. As such, semirigid foundation 102 may accommodate undulating terrain without allowing poultry and/or swine inside poultry and/or swine enclosure 102 to escape.

In some implementations, semirigid poultry and/or swine enclosure 100 may include a semirigid frame 108. Semirigid frame 108 may be coupled to and/or built upon semirigid foundation 102. Semirigid frame 108 may comprise one or more flexible joints 104 between rigid structural elements 106. In some implementations, flexible joints 104 included in semirigid foundation 102 may be the same and/or different as flexible joints 104 included in semirigid frame 108. Rigid structural elements 106 included in semirigid foundation 102 may be the same and/or different as rigid structural elements 106 included in semirigid frame. Semirigid frame 106 may be made from the same material as semirigid foundation 102. In some implementations semirigid frame 106 may be made from a different material than semirigid foundation 102.

Flexible joints 104 may allow movement between rigid structural elements 104 in the semirigid foundation 102 and/or the semirigid frame 108. As such, the frame of the poultry and/or swine enclosure may be semirigid and/or semiflexible. Poultry and/or swine enclosure 100 moves over uneven terrain, flexible joints 104 enable portions of the semirigid frame 108 to flex while the rigid structural elements 104 provide a solid frame for poultry and/or swine enclosure 100. (It is worth noting that not every single flexible joint 104, rigid structural element 106, portion of semirigid structural frame 108, portion of semirigid foundation 102, wheel 110, etc. depicted in FIG. 1 include a reference numeral. Also, while all flexible joints 104, rigid structural elements 106, semirigid structural frame 108, and semirigid foundation 102, wheels 110, etc. are depicted in the same manner in FIG. 1, they may not all be the same and/or they may be different.)

Rigid structural elements 106 may be made of piping (e.g., steel piping), framing (e.g., metal framing components), beams, wood beams, rubber, fiberglass, plastic, steel, aluminum, epoxy, composite materials, and/or other materials. Semirigid frame 108 and/or semirigid foundation 102 may be made of multiple rigid structural elements 106. In some implementations, only some of the rigid structural elements 106 may be coupled together via flexible joints 104 (as illustrated in FIG. 1). In some implementations all of the rigid structural elements 106 may be coupled together via one or more types of flexible joints 104.

Figure 2:
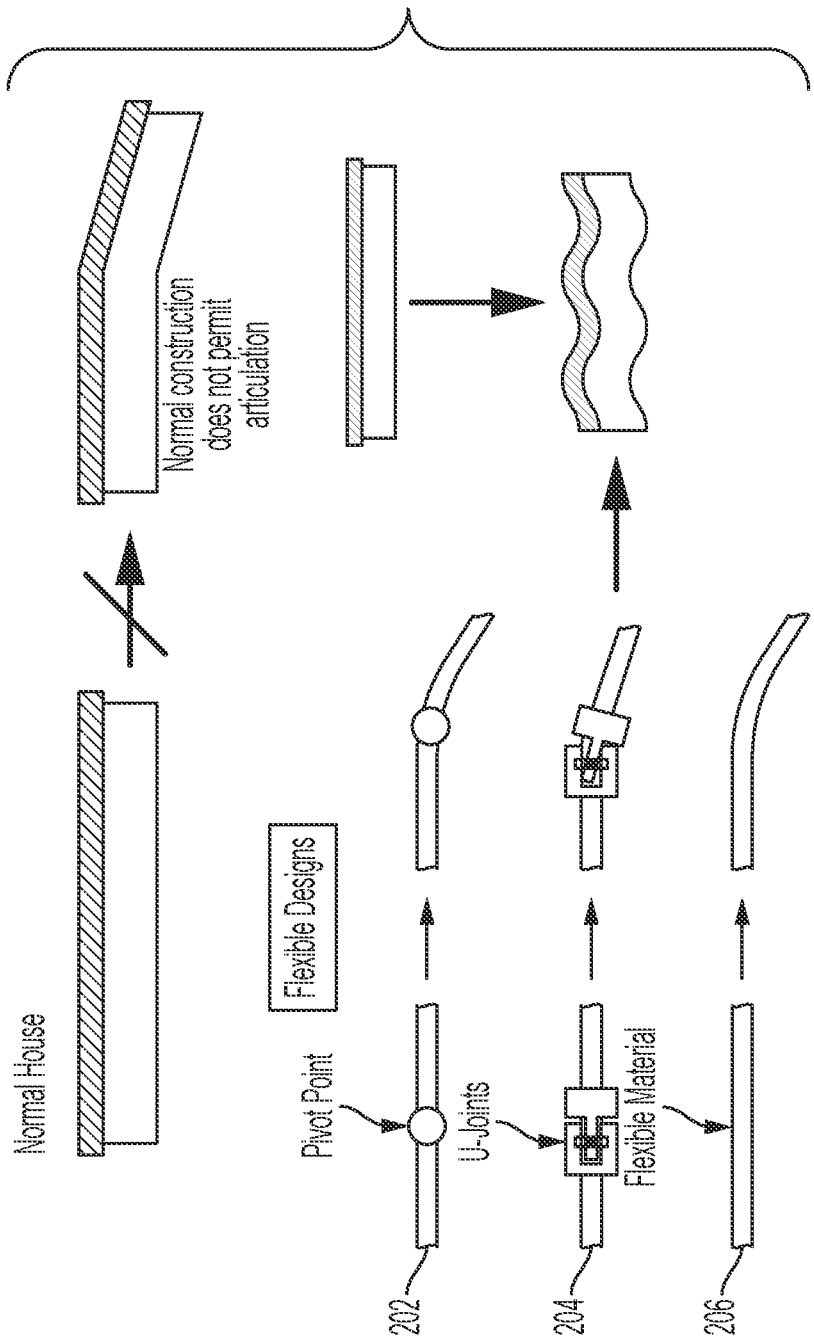
FIG. 2 illustrates some example flexible joints, in accordance with one or more implementations.

FIG. 2 illustrates some example flexible joints, in accordance with one or more implementations. The flexible joints may include one or more of a pivot point joint 202, a universal joint ("U-joint") 204, a hinge joint, a prismatic joint, a ball joint, a revolute joint, a hooke joint, and/or any other joint that would facilitate movement between the rigid structural elements. The flexible joints may facilitate horizontal, vertical, lateral, and/or any other directional movement. In some implementations, the flexible joints may comprise a flexible material 206 such that the rigid structural elements are coupled together via a flexible material.

Figure 3:
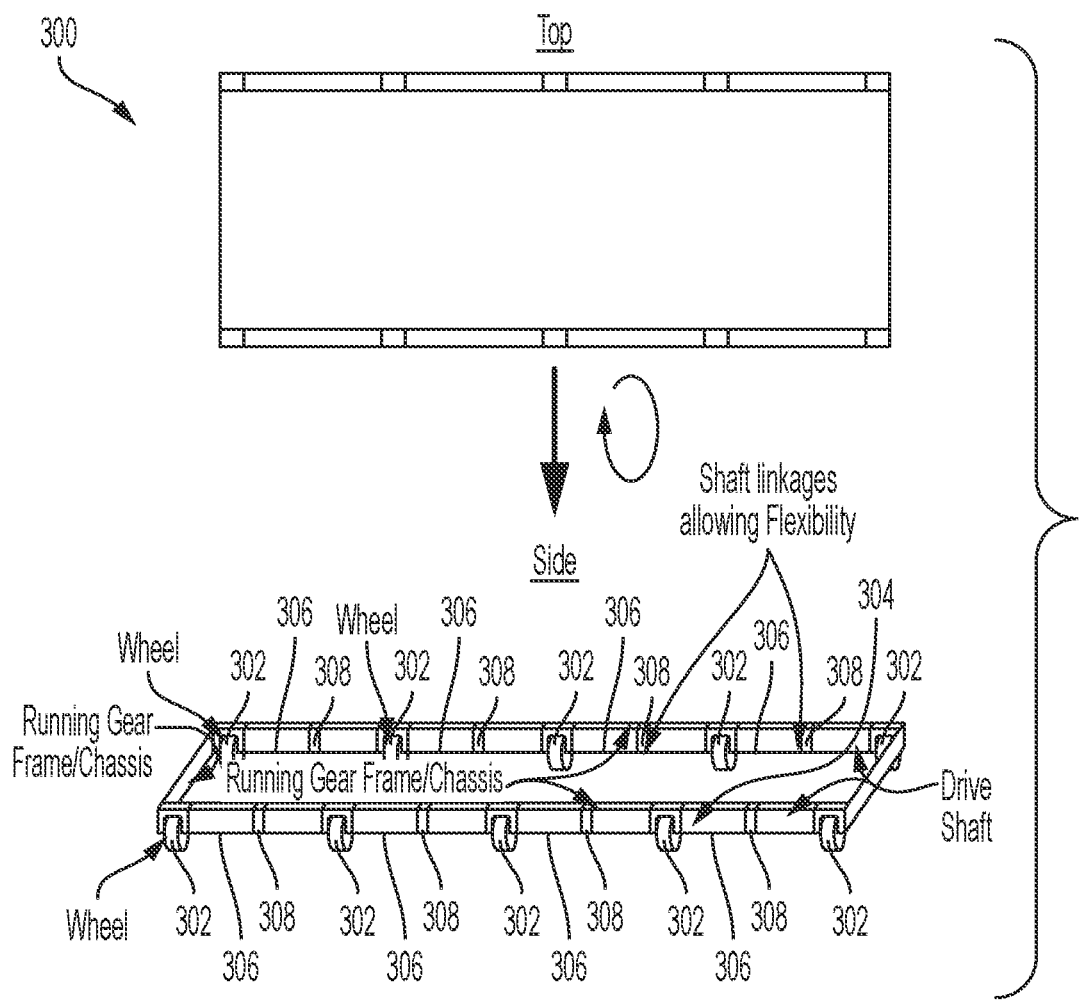
FIG. 3 illustrates an example semirigid foundation, in accordance with one or more implementations.

FIG. 3 illustrates an example semirigid foundation, in accordance with one or more implementations. Semirigid foundation 300 may include a chassis with one or more wheels 302 and/or a drive shaft 304. Wheels 302 and drive shaft 304 may enable poultry and/or swine enclosure to be mobile. The chassis may include rigid structural elements 306 and/or flexible joints 308 (the same as or similar to those in FIG. 1). In some implementations, the drive shaft 304 may have one or more flexible joints 308.

Figure 4:
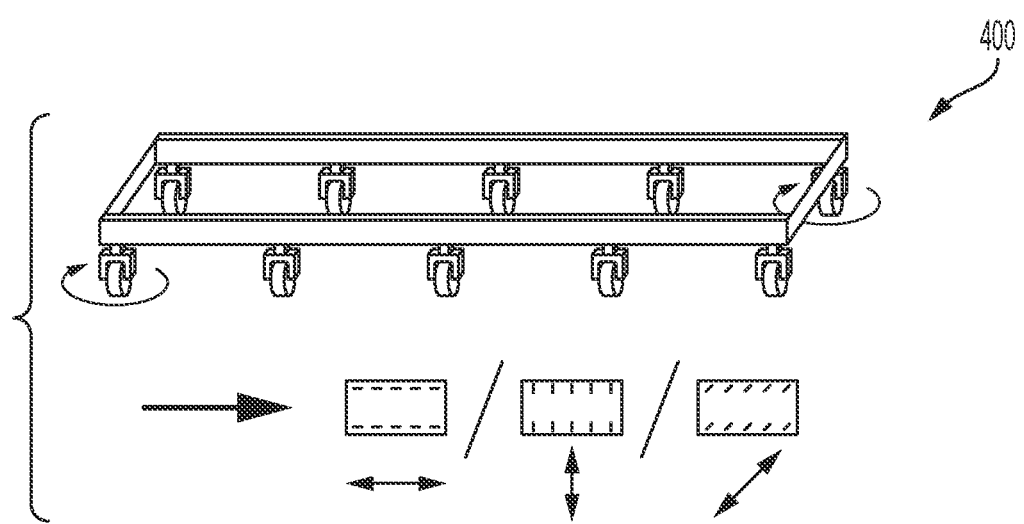
FIG. 4 illustrates a drive caster, in accordance with one or more implementations.

FIG. 4 illustrates a drive caster, in accordance with one or more implementations. In some implementations, the chassis and/or semirigid foundation may include one or more drive casters 402. Drive casters 402 may comprise wheels having independent drive and/or rotation. By way of non-limiting example, drive casters 402 may comprise an independently motorized wheel apparatus.

Returning to FIG. 1, poultry and/or swine enclosure 100 may comprise multiple wall barriers 112 and/or roof barriers 114. Wall barriers 112 and/or roof barriers 114 may at least partially form the enclosure and/or contain the poultry and/or swine within the enclosure. Wall barriers 112 and/or roof barriers 114 may be coupled to semirigid foundation 102 and/or semirigid frame 108. In some implementations, wall barriers 112 and/or roof barriers 114 may be resiliently flexible. By way of non-limiting example, wall barriers 112 and/or roof barriers 114 may be made of one or more of and/or a combination of fences, walls, netting, wood, paneling, mesh, wire, cloth, metal sheeting, shingles, tarpaper, windows, canvas, plastic, tarp, rubber, and/or other materials. In some implementations, one or more wall barriers 112 (e.g., outer walls) may consist of chicken wire or a comparable predator-deterring barrier that doesn't prevent fresh air and sunlight from entering. In some implementations, for example, one or more portions of wall barriers 112 may include canvas, plastic, and/or another material that rolls up/down for temperature regulation (the deployment of which may automated, including thermostatic regulation). In some implementations, the one or more wall barriers 112 may have multiple layers with one or more (e.g., multiple) slits along its length in order to conform to the contours of the field and/or close any gaps through which the animals could escape.

In some implementations, wall barriers 112 and/or roof barriers 114 may be rigid. The rigid wall barriers 112 and/or roof barriers 114 may be coupled together via flexible wall connectors 105. Flexible wall connectors 105 may connect rigid wall barriers 112 and allow some flexibility between wall barriers 112. By way of non-limiting example, the flexible wall connectors 105 may comprise a flexible material disposed between two or more rigid wall barriers 112, a sliding channel or groove that enables the rigid wall barriers 112 to slide such that one wall barrier may slide up/down to accommodate a dip in the field while the other wall barrier remains at the same height or slides up/down to a different level), one or more hinges disposed between two or more rigid wall barriers 112, and/or other flexible wall connectors. (In FIG. 1, the flexible wall connectors 105 may appear to be located at individual points between wall barriers 112, however, it is contemplated that such flexible wall connectors run the entire junction between wall barriers 112 and/or a portion of the junction between wall barriers 112).

Figure 5:
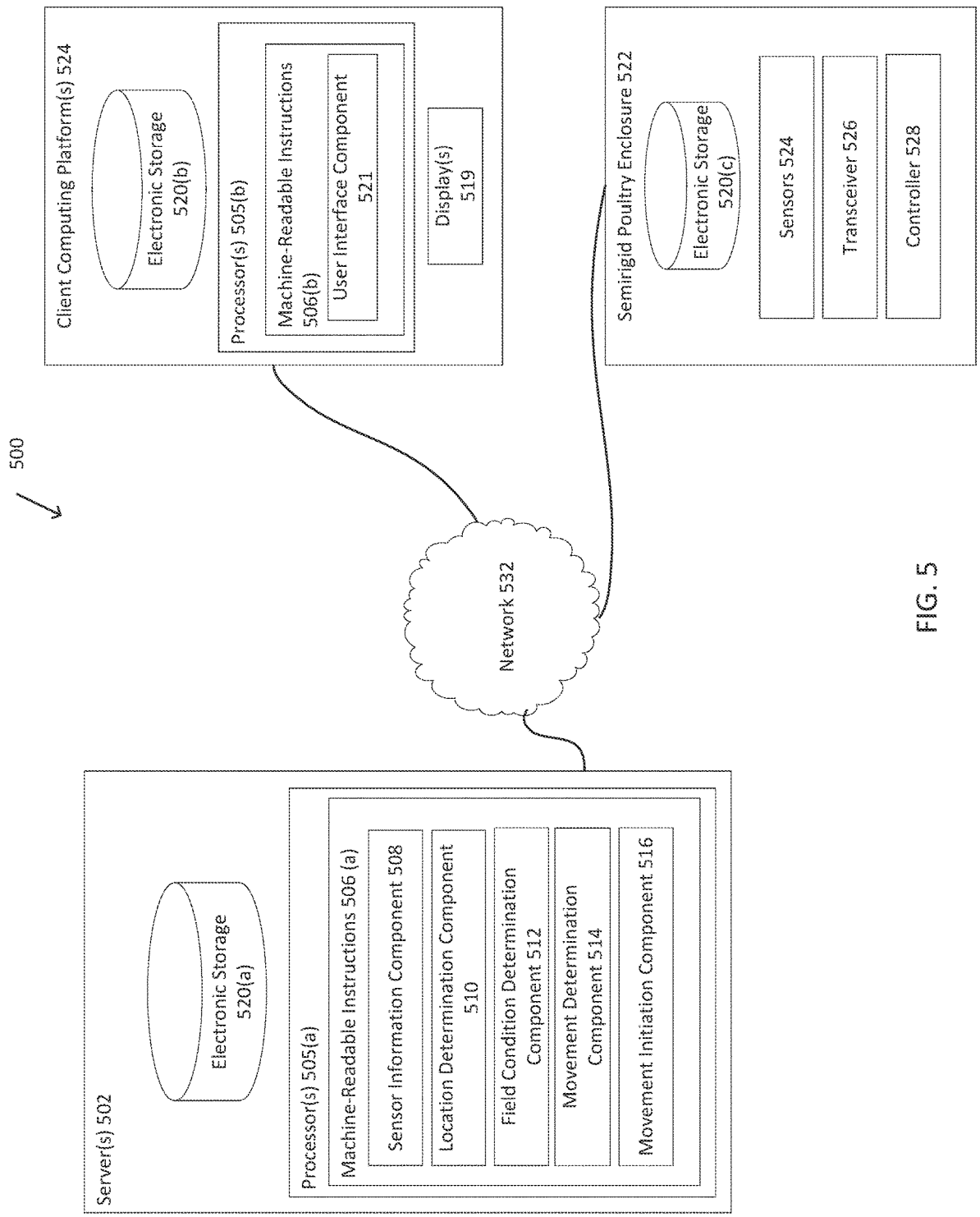
FIG. 5 illustrates an automated movement system for a semirigid poultry and/or swine enclosure, in accordance with one or more implementations.

In some implementations, the semirigid poultry enclosure may comprise an automated movement system for the semirigid poultry enclosure. FIG. 5 illustrates automated movement system 500, in accordance with one or more implementations. Automated movement system 500 may be configured to move and/or initiate movement for a semirigid poultry enclosure that is at least 90 feet in length. As set forth herein, the semirigid poultry enclosure may include one or more of a semirigid foundation, a semirigid frame, one or more wall barriers, a roof barrier, and/or other components. Such elements may enable the semirigid poultry enclosure, with its large size of at least 100 feet in length, to move over undulating terrain in an automated manner. In some implementations, moving such a large poultry enclosure may require planned and/or coordinated movements and a semirigid foundation that can accommodate the undulating terrain during such movement. Without a semirigid foundation and/or coordinated location and/or positioned based movement, moving such a large poultry enclosure may lead to structural issues in the poultry enclosure, movement issues (e.g., getting stuck), and/or power requirement issues. Additionally, a semirigid foundation with coordinated location and/or positioned based movement enables pre-planned movements, warnings of potential hazards or problems, remote control of the housing unit, and/or other advantages typically unavailable for such large poultry enclosures and/or large scale pasture raised poultry operations.

Automated movement system 500 may include one or more sensors 524, controller(s) 528, transceiver(s) 526, processor(s) 505, server(s) 502, client computing platform(s) 524, electronic storage 520, and/or other components. One or more components of automated movement system 500 may be configured to transmit information over network 532. For example, transceiver 526 may be configured communicate with server(s) 502 by transmitting information via network 532. In some implementations, one or more of server(s) 502, client computing platform(s) 524, and/or semirigid poultry enclosure 522 may be configured to communicate via one or more architectures (e.g., client server architectures, etc.). One or more components of automated movement system 500 may be coupled to semirigid poultry enclosure.

Automated movement system 500 may comprise multiple sensors 524. In some implementations, sensors 524 may include GPS sensors, position sensors, optical distance sensors and encoders, and/or other sensors. Individual ones of sensors 524 may be coupled to individual ones of the multiple wheels. Sensors 524 may be configured to generate sensor information characterizing a location and/or a position of the semirigid poultry enclosure. The position of the semirigid poultry enclosure may include a position within the field indicating the positioning of the semirigid poultry enclosure. The location of the semirigid poultry enclosure may include GPS coordinates and/or a relative location of the semirigid poultry enclosure along a preprogrammed route and/or path.

The one or more server(s) 502 and/or client computing platform(s) 524 may include one or more physical processor(s) 505 configured to execute one or more computer program components including machine readable instructions 506. The computer program components may include one or more of sensor information component 508, location determination component 510, field condition determination component 512, movement determination component 514, movement initiation component 516, user interface component 521, and/or other components.

Sensor information component 508 may be configured to obtain the sensor information. The sensor information may be obtained from one or more sensors coupled to the semirigid poultry enclosure. By way of non-limiting example, the one or more sensors may be coupled to the semirigid foundation and/or the semirigid poultry enclosure, to one or more individual wheels of the semirigid poultry enclosure, to one or more corners and/or midpoints of the semirigid foundation, and/or to the outside of the semirigid poultry enclosure. By way of another non-limiting example, one or more sensors may be located within the semirigid poultry enclosure to monitor and/or gather information related to the poultry within the poultry enclosure. By way of non-limiting example, the one or more sensors may include thermal/IR sensors, motion sensors and/or laser counters such that the information gathered includes temperature information, humidity information, pressure information, quantity information and/or other information related to the poultry and/or conditions within the poultry enclosure.

In some implementations, the sensor information may characterize a location and/or position of the semirigid poultry enclosure, a condition of the field, and/or other characteristics of the semirigid poultry enclosure, the poultry, and/or the field. The location of the semirigid poultry enclosure may include GPS coordinates indicating an absolute location of the semirigid poultry enclosure and/or a relative location of the semirigid poultry enclosure within the field and/or along a path In some implementations, the sensor information may include information characterizing a condition of the field on which the semirigid poultry enclosure is moving/will move, one or more aspects of the weather outside the semirigid poultry enclosure, a temperature and/or humidity level inside the semirigid poultry enclosure, poultry activity within the semirigid poultry enclosure, poultry mortality within the semirigid poultry enclosure, an obstacle in the path of and/or near the semirigid poultry enclosure, and/or other information.

Location determination component 510 may be configured to determine the location and/or position of the semirigid poultry enclosure. The location and/or position of the semirigid poultry enclosure may include an absolute and/or relative location and/or position of the semirigid poultry enclosure within the field, GPS coordinates of the semirigid poultry enclosure, a mapping of the position of the semirigid poultry enclosure, and/or other information. Location determination component 510 may be configured to determine the location and/or the position of the semirigid poultry enclosure based on the sensor information.

In some implementations, the movement, starting point, and/or ending point of the semirigid poultry enclosure may be predetermined such that location determination component 510 may be configured to determine where along the predetermined path and/or route the semirigid poultry enclosure is.

Field condition determination component 512 may be configured to determine the condition of the field. Specifically, field condition determination component 512 may be configured to determine one or more characteristics of the field condition(s). For example, field condition determination component 512 may be configured to determine whether the field is wet and/or how wet it is, whether the field is muddy and/or how much mud is present, whether the field is icy, whether the field is covered in snow and/or how much snow, whether the field is dry and/or needs water, and/or another field condition. In some implementations, field condition determination component 512 may be configured to determine a manure level of the field (e.g., how much manure is on the field within the semirigid poultry enclosure). In some implementations, the condition of the field may be determined based on the soil. One or more sensors may be configured to obtain soil information such that field condition determination component 512 may determine the condition of the field based on condition of the soil. One or more of field conditions and/or characterizations of the field conditions may be determined based on the sensor information.

Movement determination component 514 may be configured to determine an automated movement based on the sensor information. The movement(s) of the semirigid poultry enclosure may be coordinated to allow pastured poultry fresh forage access (along with even manure deposition) while maximizing useful pasture area. Movement determination component 514 may determine coordinated movements that account for and/or the shape of the field (e.g., pasture shape), any terrain limitations, ambient weather, poultry condition, efficient placement/harvesting locations, and/or other aspects of flock management. Movement determination component may be configured to determine automated movement(s) that assist in managing semirigid poultry enclosure movements including planning movements, determining desired starting and/or finishing locations using delineated enclosure movements, making real time decisions based on one or more of the position and/or location of the semirigid poultry enclosure, the field conditions, the weather, poultry health and/or mortality, one or more obstacles, and/or other routinely monitored parameters.

Movement initiation component 516 may be configured to initiate automated movement of the semirigid poultry enclosure based on the sensor information, the location and/or position of the semirigid poultry enclosure, a determination of the automated movement to be made based on the sensor information, and/or other information. In some implementations, determining an automated movement based on the sensor information may include determining movement of one or more of the multiple wheels based on the location and/or position of the semirigid poultry enclosure in addition to one or more of a condition of the field, weather, a temperature of the semirigid poultry enclosure, poultry activity, poultry mortality, an obstacle and/or other sensor information.

In some implementations, the individual ones of the multiple wheels of the semirigid poultry enclosure are independently movable and/or controllable. In some implementations, automated movement of the semirigid poultry enclosure may include initiating movement of one or more of the individual ones of the multiple wheels.

In some implementations, movement determination component 514 may be configured to determine an automated movement of one or more wheels of the semirigid poultry enclosure and/or the semirigid poultry enclosure via artificial intelligence. Artificial intelligence may simulate human intelligence with computer circuits and software. There are multiple approaches to machine intelligence (e.g., machine learning, expert systems, neural networks, fuzzy logic systems, and/or other types of machine learning and/or artificial intelligence). Machine learning enables systems to learn and improve from experience without being explicitly programmed. Machine learning builds and uses algorithms that receive input data and use statistical analysis to make output predictions. The output may be updated as new data is available. Machine learning may include supervised learning, unsupervised learning, semi-supervised learning, reinforcement learning, and/or other types of machine learning. In some implementations, machine-learning may include neural networks.

Neural networks may comprise computer simulations of neuro-physiological structures (e.g., nerve cells). Artificial neural networks learn by examples, association, or experience, rather than being programmed with task-specific rules. Neural networks may generalize, make inferences, and/or make predictions about data that they have not yet been exposed to.

Expert systems may use rule-based algorithms to capture knowledge of human experts by obtaining information and making a series of decisions based on facts and logical branching. These systems involve human experts for constructing and/or training the decision models. Fuzzy logic systems use a "degrees of truth" approach that allows computers to represent words and concepts such as vagueness, uncertainty, and degrees of an attribute. Fuzzy logic systems enable computers to represent complex relationships and interactions between such concepts. They can also be a useful tool for describing human attributes in terms that a computer can process. Neuro-fuzzy technology is a hybrid artificial intelligence technique employing the capabilities of both neural network learning and fuzzy logic model specification.

Figure 6:
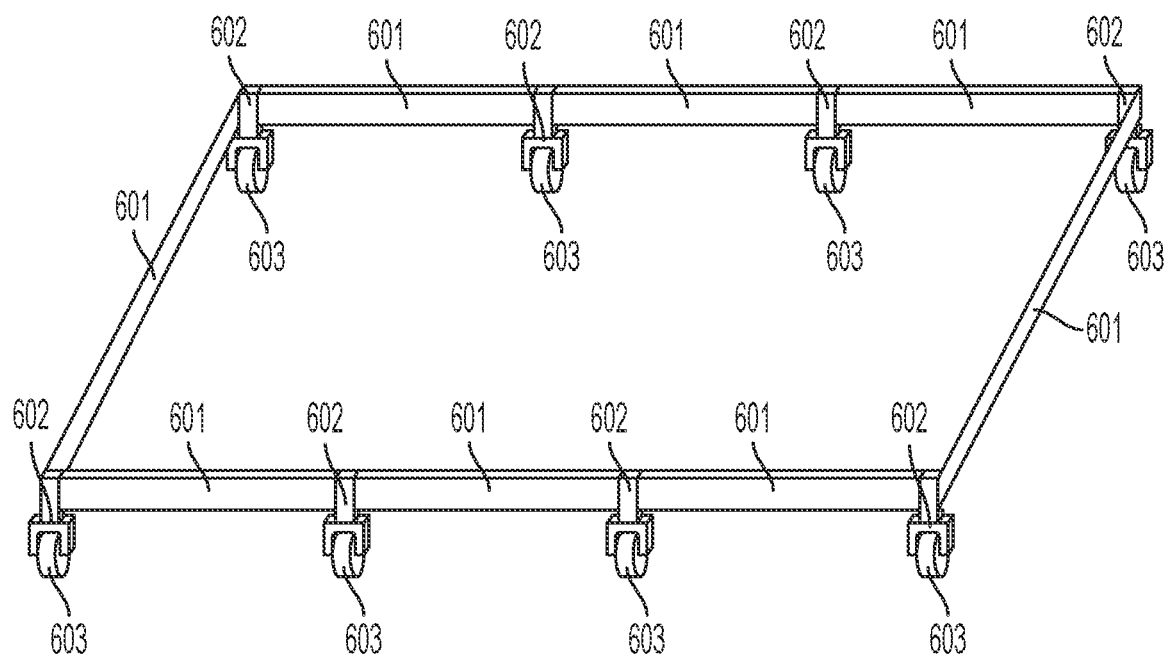
FIG. 6 illustrates an example semirigid foundation with an automated movement system, in accordance with one or more implementations.

FIG. 6 illustrates an example semirigid foundation with an automated movement system, in accordance with one or more implementations. In some implementations, as previously set forth herein (see e.g., flexible material 206 of FIG. 2), the flexible joints of the semirigid foundation may include one or more flexible portions 601 comprising flexible material disposed between two or more rigid structural elements 602. In some implementations, flexible portions

601 of the semirigid foundation and/or semirigid poultry enclosure may comprise a material that is more flexible than the rigid structural elements 602 such that the rigid structural elements are connected via flexible portions 601 that facilitate flexion of the semirigid foundation and/or the semirigid poultry enclosure during movement over undulating terrain. The flexible material may comprise a seemingly stiff material having dimensions (e.g., a length, thickness, diameter, and/or other dimension) that enable flexibility. By way of non-limiting example, the flexible material may comprise a metal truss bar, pipe, and/or rod having a length and diameter that makes its more flexible than the rigid structural elements 602. By way of non-limiting example, flexible portions 601 may include longer segments disposed between rigid structural elements 602 that house wheels 603.

Figure 7:
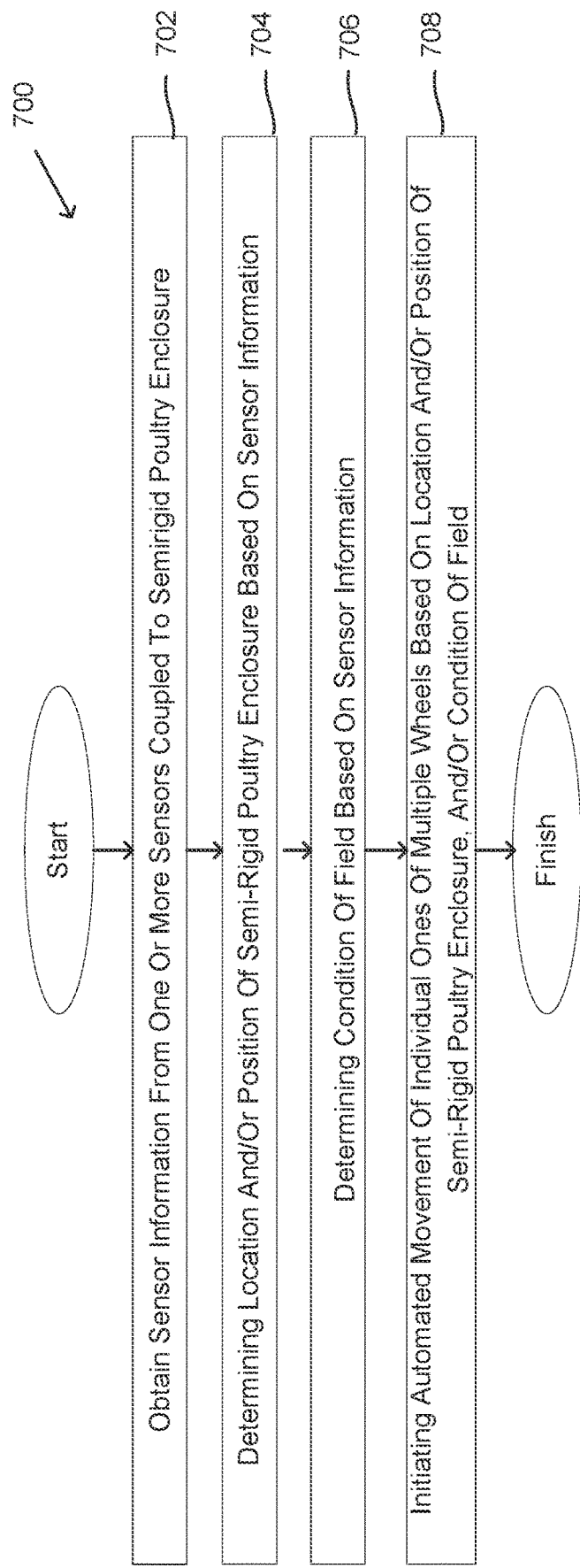
FIG. 7 illustrates a method for controlling automated movement of a semirigid poultry and/or swine enclosure.

FIG. 7 illustrates a method for controlling automated movement of a semirigid poultry and/or swine enclosure. The operations of method 700 presented below are intended to be illustrative. In some implementations, method 700 may be accomplished with one or more additional operations not described, and/or without one or more of the operations discussed. Additionally, the order in which the operations of method 700 are illustrated in FIG. 7 and described below are not intended to be limiting.

In some implementations, method 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700.

Method 700 may include a method for initiating automated movement of a partially floorless semirigid poultry enclosure. The method may be implemented by one or more physical computer processors and a semirigid poultry enclosure on a field wherein the semirigid poultry enclosure is at least 90 feet in length. The semirigid poultry enclosure may include multiple wheels coupled to a semirigid foundation of the semirigid enclosure.

At operation 702, sensor information may be obtained. The sensor information may be obtained from one or more sensors coupled to the semirigid foundation and/or the semirigid poultry enclosure. The sensor information may characterize a location and/or a position of the semirigid poultry enclosure, a condition of the field, and/or other characteristics of the semirigid poultry enclosure, the poultry, and/or the field. For example, the sensor information may include one or more of GPS information, information characterizing one or more of weather, a temperature of the semirigid poultry enclosure, poultry activity, poultry mortality, an obstacle, and/or other information. Operation 702 may be performed by a sensor information component that is the same as or similar to sensor information component 508 (see e.g., FIG. 5).

At operation 704, the location and/or the position of the semirigid poultry enclosure may be determined. The location and/or position of the semirigid poultry enclosure may be determined based on the sensor information. For example, the location and/or position of the semirigid poultry enclosure may be determined based on GPS information. Operation 704 may be performed by a location determination component that is the same as or similar to sensor information component 510 (see e.g., FIG. 5).

At operation 706, the condition of the field on which the semirigid poultry enclosure is moving and/or will move may be determined. The condition of the field may be determined based on the sensor information. Operation 706 may be performed by a field condition determination component that is the same as or similar to field condition determination component 512 (see e.g., FIG. 5).

At operation 708, automated movement of individual ones of the multiple wheels may be initiated. Movement may be initiated based on the location and/or the position of the semirigid poultry enclosure, the condition of the field, and/or other sensor information. The automated movement of the individual ones of the multiple wheels may be coordinated such that the location and/or position of the semirigid poultry enclosure changes. Operation 708 may be performed by a movement initiation component that is the same as or similar to movement initiation component 514 (see e.g., FIG. 5).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A floorless semirigid poultry enclosure configured to flex and/or adjust to accommodate undulating terrain during movement on a field, the semirigid poultry enclosure comprising:
   a semirigid foundation including one or more flexible portions disposed between two or more rigid structural elements, wherein the flexible portions are longer than the rigid structural elements;
   multiple wall barriers coupled to the semirigid foundation;
   multiple wheels coupled to the semirigid foundation to facilitate movement of the semirigid poultry enclosure, wherein poultry within the semirigid poultry enclosure have access to the field from within the enclosure; and
   an automated movement system for the semirigid poultry enclosure to facilitate movement of the semirigid poultry enclosure across the field.

2. The semirigid poultry enclosure of claim 1, wherein the automated movement system includes one or more sensors that provide sensor information, the sensor information including information characterizing one or more of a condition of the field, weather, a temperature of the semirigid poultry enclosure, poultry activity, poultry mortality, and/or an obstacle.

3. The semirigid poultry enclosure of claim 2, wherein the sensors include GPS sensors and/or optical distance sensors and/or encoders and the sensor information includes GPS information, distance information, and/or location information.

4. The semirigid poultry enclosure of claim 2, wherein the one or more processors are further configured by machine readable instructions to determine an automated movement based on the sensor information.

5. The semirigid poultry enclosure of claim 4, wherein determining an automated movement based on the sensor information includes determining movement of one or more of the multiple wheels based on one or more of a condition of the field, weather, a temperature of the semirigid poultry enclosure, poultry activity, poultry mortality, and/or an obstacle.

6. The semirigid poultry enclosure of claim 1, wherein individual ones of the multiple sensors are coupled to individual ones of the multiple wheels.

7. The semirigid poultry enclosure of claim 1, wherein individual ones of the multiple wheels are independently movable such that initiating automated movement of the semirigid poultry enclosure via the automated movement system includes initiating movement of one or more of the individual ones of the multiple wheels.

8. The semirigid poultry enclosure of claim 1, wherein the one or more physical processors are further configured by machine-readable instructions to determine an automated movement via artificial intelligence based on the sensor information.

9. The system of claim 1, wherein the flexible portions comprise one or more of a metal truss bar, pipe, and/or rod having a length and diameter that make the rod more flexible and longer than the rigid structural elements.

10. The system of claim 9, wherein the rigid structural elements house individual ones of the multiple wheels.

11. The system of claim 9, wherein the semirigid poultry enclosure is at least 100 feet in length.

12. A floorless semirigid poultry enclosure with an automated movement system, the automated movement system being configured to facilitate movement of the floorless semirigid poultry enclosure on a field wherein the floorless semirigid poultry enclosure is at least 100 feet in length, the semirigid poultry enclosure comprising:
 a semirigid foundation including one or more flexible portions disposed between two or more rigid structural elements, wherein the flexible portions are longer than the rigid structural elements;
 multiple wheels coupled to the semirigid foundation;
 an automated movement system with multiple sensors coupled to the semirigid foundation and/or the semirigid enclosure, the multiple sensors configured to generate sensor information; and
 one or more processors configured by machine readable instructions to:
  obtain the sensor information;
  initiate automated movement of individual ones of the multiple wheels based on the sensor information, wherein the automated movement of the individual ones of the multiple wheels is coordinated such that the location and/or position of the semirigid poultry enclosure changes.

13. The automated movement system of claim 12, wherein the sensor information includes information characterizing one or more of weather, a temperature of the semirigid poultry enclosure, poultry activity, poultry mortality, and/or an obstacle, and wherein the automated movement is initiated based on the location and/or the position of the semirigid poultry enclosure and/or the condition of the field.

14. The automated movement system of claim 12, wherein the semirigid foundation includes flexible portions comprising a material that is more flexible than rigid structural elements disposed between the flexible portions, such that the rigid structural elements are connected via the flexible portions that facilitate flexion of the semirigid poultry enclosure during movement over undulating terrain.

15. The automated movement system of claim 12, wherein the sensors include GPS sensors and the sensor information includes GPS information.

16. The automated movement system of claim 12, wherein the one or more physical processors are further configured by machine-readable instructions to determine an automated movement via artificial intelligence based on the sensor information.

* * * * *

UNITED STATES PATENT AND TRADEMARK OFFICE
CERTIFICATE OF CORRECTION

| | |
|---|---|
| PATENT NO. | : 12,070,018 B2 |
| APPLICATION NO. | : 18/123873 |
| DATED | : August 27, 2024 |
| INVENTOR(S) | : Raymond Paul Greive, Jeffrey Lane McDaniel and Daniel J. Coady |

It is certified that error appears in the above-identified patent and that said Letters Patent is hereby corrected as shown below:

In the Claims

Column 13, Claim 9, Line 22, that reads "The system of claim 1,", should read - The semirigid poultry enclosure of claim 1, -

Column 13, Claim 10, Line 26, that reads "The system of claim 9,", should read - The semirigid poultry enclosure of claim 9, -

Column 13, Claim 11, Line 28, that reads "The system of claim 9,", should read - The semirigid poultry enclosure of claim 9, -

Signed and Sealed this
Fifteenth Day of October, 2024

Katherine Kelly Vidal
*Director of the United States Patent and Trademark Office*